US007652397B2

(12) United States Patent
Lin et al.

(10) Patent No.: US 7,652,397 B2
(45) Date of Patent: Jan. 26, 2010

(54) PARALLEL-CONNECTED UNINTERRUPTIBLE POWER SUPPLY SYSTEM

(75) Inventors: Hung-Chieh Lin, Taoyuan (TW); Tung-Hung Hsien, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 412 days.

(21) Appl. No.: 11/834,819

(22) Filed: Aug. 7, 2007

(65) Prior Publication Data

US 2008/0211308 A1    Sep. 4, 2008

(30) Foreign Application Priority Data

Mar. 2, 2007    (TW) .............................. 96107289 A (51) Int. Cl.
*H01B 7/30* (2006.01)
(52) U.S. Cl. ...................................................... 307/147
(58) Field of Classification Search .................. 307/147
See application file for complete search history.

(56) References Cited

U.S. PATENT DOCUMENTS

2005/0130459 A1*    6/2005    Sagues et al. .............. 439/76.1

* cited by examiner

*Primary Examiner*—Robert L. DeBeradinis (57) ABSTRACT

Disclosed is a parallel-connected uninterruptible power supply system connected with a power source and a load. The uninterruptible power supply system includes a power distribution circuit having a first connector, a plurality of uninterruptible power supplies having a plurality of second connectors, and a plurality of transmission lines having a plurality of third connectors. The first connectors, the second connectors and the third connectors each includes a first conducting structure and a second conducting structure. When the second conducting structure of the third connector is detached from the second conducting structure of the first connector or the second conducting structure of the second connector, the second conducting structures are detached from each other first so that the pull-down circuit of the corresponding uninterruptible power supply generates a control signal to a controller to stop the operation of the uninterruptible power supply. Next, the third connector is detached from the first connector or the second connector so as to remove the malfunctioned uninterruptible power supply.

14 Claims, 8 Drawing Sheets

PARALLEL-CONNECTED UNINTERRUPTIBLE POWER SUPPLY SYSTEM

FIELD OF THE INVENTION

The present invention is related to an uninterruptible power supply system, and more particularly to a parallel-connected uninterruptible power supply system.

BACKGROUND OF THE INVENTION

Uninterruptible power supply (UPS) is an emergent power supply device connected between a power source and a load, in which the power source can be a commercial power supply or a regulated AC power. The main function of uninterruptible power supply is that the internal rechargeable battery of the uninterruptible power supply is configured to store electric energy when the power source is available for supplying power and release the stored energy to a load when the power source is unavailable for supplying power, in order to ensure the normal operation of the load.

In order to protect important electronic device efficiently and safely, UPS has been widely employed to ensure the normal operation of a variety of electronic devices. However, the on-line parallel-connected UPS is by far the most suitable choice for providing emergent power for electronic devices.

Figure 1:
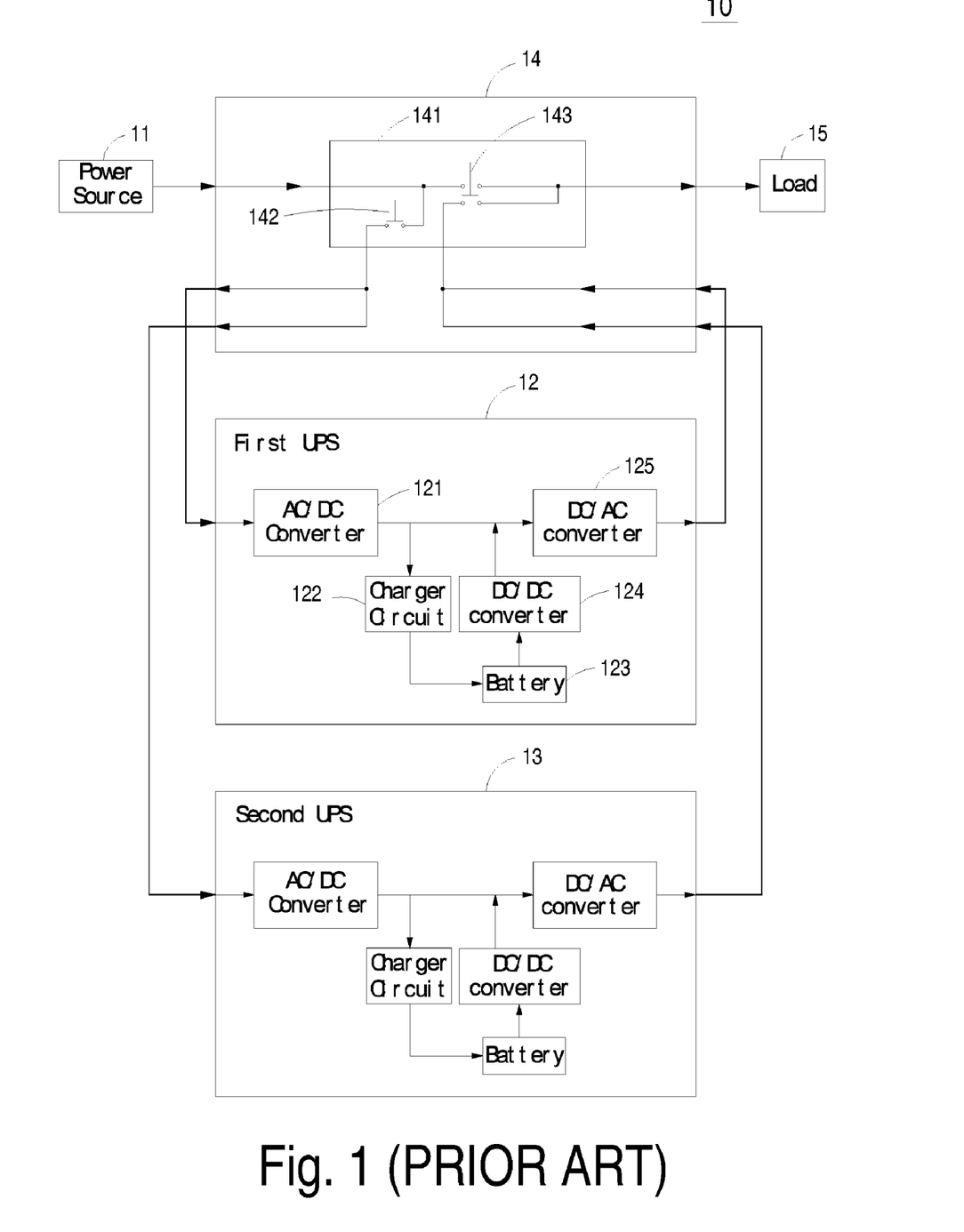
FIG. 1 is a circuit diagram showing the structure of a conventional parallel-connected uninterruptible power supply system.

Referring to FIG. 1, a conventional parallel-connected uninterruptible power supply system is shown. As shown in FIG. 1, the parallel-connected uninterruptible power supply system 10 includes a power source 11, a first uninterruptible power supply 12, a second uninterruptible power supply 13, and a distribution box 14. The distribution box 14 includes a switch circuit 141 made up of switch elements 142 and 143.

When the switch element 142 within the switch circuit 141 of the distribution box 14 is ON, the first uninterruptible power supply 12 and the second uninterruptible power supply 13 are configured to receive an input AC power from the power source 11 through the switch element 142, respectively. The input AC power is rectified and filtered by the first uninterruptible power supply 12 and the second uninterruptible power supply 13, and thereby outputting energy. When the switch element 143 within the switch circuit 141 of the distribution box 14 is switched to be connected with the output terminals of the first uninterruptible power supply 12 and the second uninterruptible power supply 13, the energy outputted from the first uninterruptible power supply 12 and the energy outputted from the second uninterruptible power supply 13 is provided to power a load 15 in response to the load's demands.

Because both of the first uninterruptible power supply 12 and the second uninterruptible power supply 13 have the same circuit structure, it is intended to illustrate the circuit configuration and operating principle of the uninterruptible power supply by taking the first uninterruptible power supply 12 as an example. Referring to FIG. 1, the first uninterruptible power supply 12 principally includes an AC/DC converter 121, a charger circuit 122, a battery 123, a DC/DC converter 124, and a DC/AC converter 125.

The AC/DC converter 121 is configured to receive the input AC power from the power source 11 and convert the input AC power into a DC power. The charger circuit 122 is connected with the AC/DC converter 121 for receiving the DC power from the AC/DC converter 121 and converting the DC power into a DC voltage tailored to charge the battery 123.

When the power source is available for supplying power, the input AC power provided by the power source 11 is converted into a DC voltage by the AC/DC converter 121. The DC voltage outputted from the AC/DC converter 121 is converted into a DC voltage tailored to charge the battery 123 by the charger circuit 122. In the meantime, the DC voltage outputted from the AC/DC converter 121 is converted into an output AC voltage by the DC/AC converter 125, and the output AC voltage is outputted to the load 15 through the switch element 143 within the switch circuit 141.

When the power source is unavailable for supplying power, the battery 123 outputs a DC voltage which is then boosted by the DC/DC converter 124. The boosted DC voltage is delivered to the DC/AC converter 125 and converted into an output AC voltage by the DC/AC converter 125. The output AC voltage is delivered to the load 15 through the switch element 143 within the switch circuit 141.

The first uninterruptible power supply 12 and the second uninterruptible power supply 13 are connected in parallel with each other. Hence, when one of the uninterruptible power supplies is malfunctioned, the switch element must be OFF to break the connection between the power source 11 and the uninterruptible power supplies, and the switch element 143 must be switched to a bypass route so that the AC power provided by the power source 11 can be outputted to the load 15. In this manner, the wiring of the malfunctioned uninterruptible power supply is isolated from power and the malfunctioned uninterruptible power supply can be securely removed from the system for repair. Although the aforementioned parallel-connected uninterruptible power supply system can allow the malfunctioned uninterruptible power supply to be replaced with safety, the load 15 is directly powered by the output of the bypass route under this condition. In this case, the load 15 will be no longer protected by the uninterruptible power supply. If the power source is unavailable for supplying power, the load 15 can not operate normally.

Figure 2:
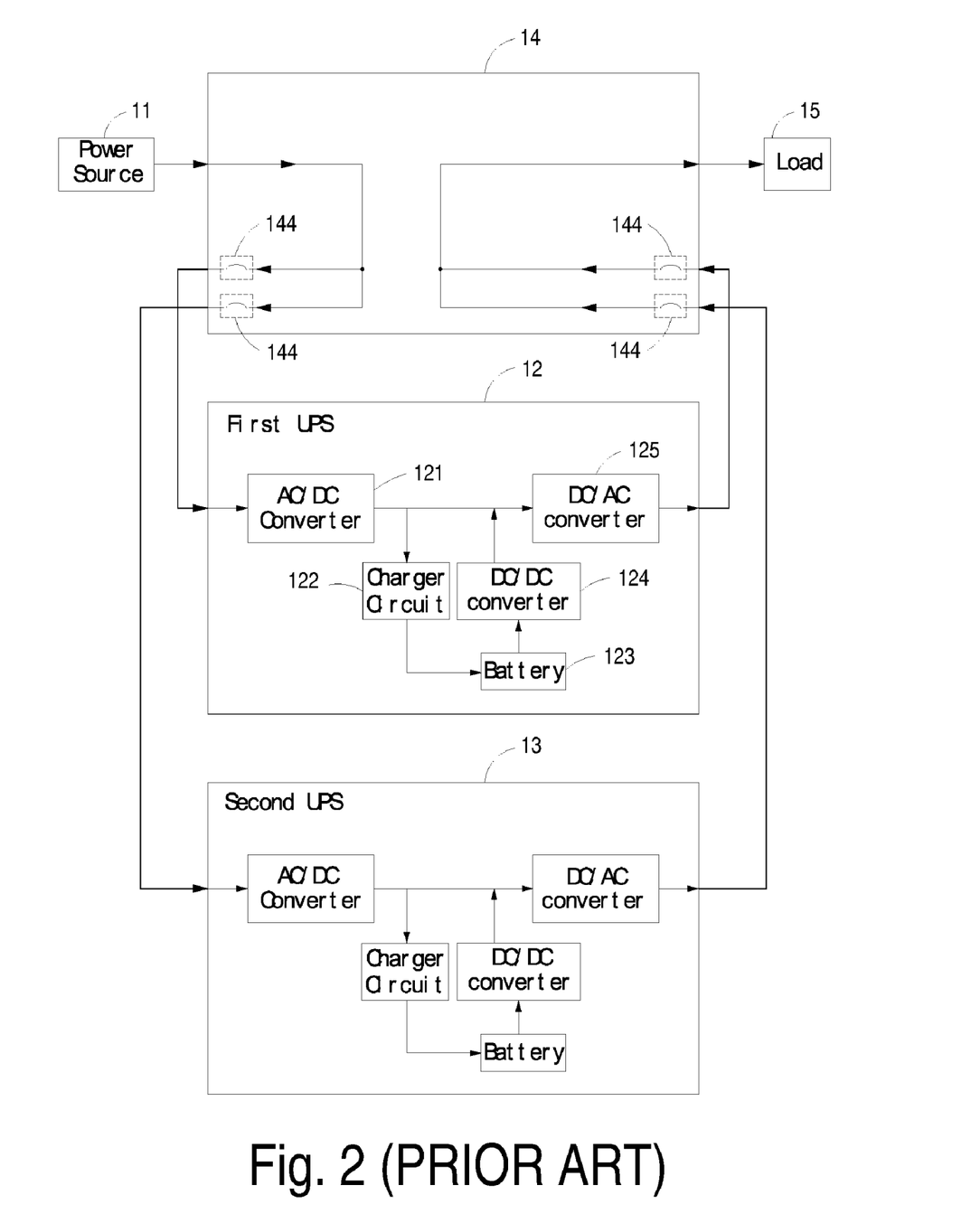
FIG. 2 is a circuit diagram showing the structure of another conventional parallel-connected uninterruptible power supply system.

Referring to FIG. 2, the structure of another conventional parallel-connected uninterruptible power supply system is shown. As shown in FIG. 2, the parallel-connected uninterruptible power supply system 10 also includes a power source 11, a first uninterruptible power supply 12, a second uninterruptible power supply 13, and a distribution box 14, wherein a plurality of breakers 144 are individually placed between the distribution box 14, the first uninterruptible power supply 12 and the second uninterruptible power supply 13.

The advantage of the above-mentioned uninterruptible power supply system is that when one of the uninterruptible power supplies is malfunctioned, the other one can provide power to the load 15. Under this condition, however, the breaker 144 connected to the malfunctioned uninterruptible power supply has to be closed first in order to isolate the wiring of the malfunctioned uninterruptible power supply from the power, so that the malfunctioned uninterruptible power supply can be removed from the system for repair.

The disadvantage of the above-mentioned uninterruptible power supply system is that a plurality of breakers 144 must be used, and the breakers 144 must be able to cut off all of the power-conducting terminals. For example, if the inputs of the uninterruptible power supplies 12 and 13 include a hot line and a neutral line, each of the breakers 144 must include two poles. Thus, the breakers 144 will be costly and space-consuming.

Therefore, it is necessary to develop a parallel-connected uninterruptible power supply system that can obviate the above-mentioned drawbacks.

SUMMARY OF THE INVENTION

An object of the present invention is to provide a parallel-connected uninterruptible power supply system having a power distribution circuit having a plurality of first connectors, a plurality of uninterruptible power supplies having a plurality of second connectors and a plurality of transmission lines having a plurality of third connectors, in which the first connector, the second connector and the third connector respectively include a plurality of first conducting structures and a plurality of second conducting structures having a shorter length compared with the first conducting structures. When the second conducting structure of the third connector of the transmission line is detached from the second conducting structure of the first connector of the power distribution circuit or the second conducting structure of the second connector of the uninterruptible power supply, the pull-down circuit of the corresponding uninterruptible power supply sends a control signal to a controller to stop the operation of the uninterruptible power supply. Thus, the transmission line can be detached from the power distribution circuit or the uninterruptible power supply safely, and the malfunctioned uninterruptible power supply can be removed from the system for repair. In this manner, the drawbacks encountered by the prior art can be obviated.

To this end, a broader aspect of the present invention is to provide a parallel-connected uninterruptible power supply system connected with a power source and a load. The inventive parallel-connected uninterruptible power supply system includes a power distribution circuit connected with the power source and the load and having a plurality of first connectors; a plurality of uninterruptible power supplies each includes a controller, a second connector, and a pull-down circuit, the pull-down circuit being connected with the controller and the second connector; a plurality of transmission lines each includes a third connector disposed at both ends thereof, each third connector being connected with a first connector or a second connector; wherein the first connectors, the second connectors and the third connectors include a plurality of first conducting structures and a plurality of second conducting structures. When the second conducting structure of the third connector is detached from the second conducting structure of the first connector or the second conducting structure of the second connector, the second conducting structures are detached from each other first so that the pull-down circuit of the corresponding uninterruptible power supply sends a control signal to the controller. The controller will stop the operation of the uninterruptible power supply in response to the control signal, thereby the first conducting structure of the third connector can be detached from the first connector or the second connector safely, and the malfunctioned uninterruptible power supply can be removed for repair.

Now the foregoing and other features and advantages of the present invention will be best understood through the following descriptions with reference to the accompanying drawings, wherein:

DETAILED DESCRIPTION OF THE PREFERRED EMBODIMENT

Several preferred embodiments embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 3:
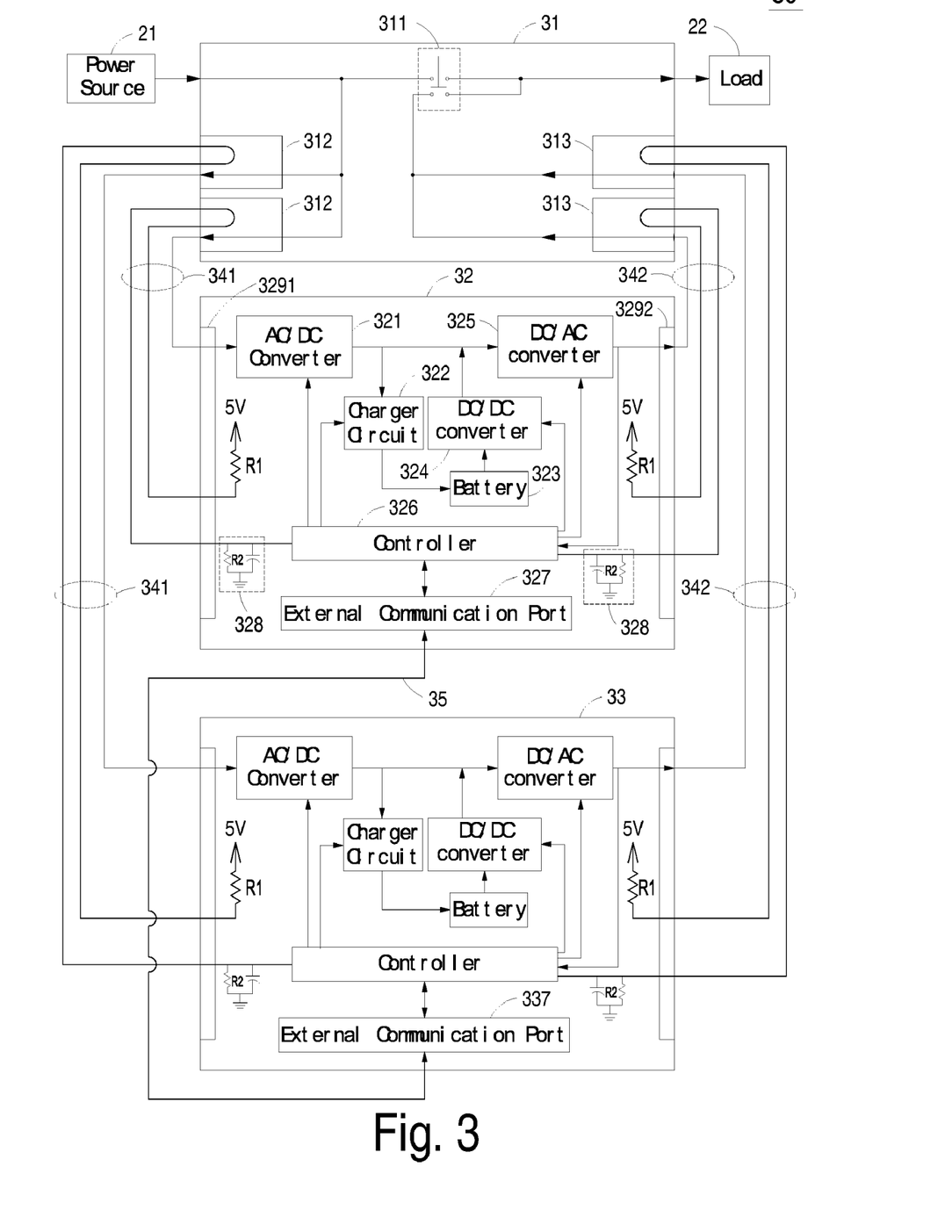
FIG. 3 is a circuit diagram showing the structure of the parallel-connected uninterruptible power supply system according to a first preferred embodiment of the present invention.

FIG. 3 shows the structure of a parallel-connected uninterruptible power supply system according to a first preferred embodiment of the present invention. As shown in FIG. 3, the parallel-connected uninterruptible power supply system 30 is connected to a power source 21 and a load 22 for receiving an AC power from the power source 21. The main function of the parallel-connected uninterruptible power supply system 30 is to store a portion of electric energy therein when the power source is available for supplying power, and release the stored energy to power the load 22 when the power source 21 is unavailable for supplying power, thereby ensuring the normal operation of the load 22.

In the present embodiment, the parallel-connected uninterruptible power supply 30 is made up of a power distribution circuit, a first uninterruptible power supply 32, a second uninterruptible power supply 33, and a plurality of power transmission lines 341 and 342. It should be noted that the power distribution circuit is preferably implemented by a distribution box 31 having a switch 311, a first connector 312 disposed at the output terminal of the distribution box 31 and a second connector 313 disposed at the input terminal of the distribution box 31. Also, the first uninterruptible power supply 32 and the second uninterruptible power supply 33 have the same circuit structure, and it is intended to illustrate the structure and principle of the uninterruptible power supply by taking the first uninterruptible power supply 32 as an example.

Referring to FIG. 3 again, the first uninterruptible power supply 32 includes an AC/DC converter 321, a charger circuit 322, a battery 323, a DC/DC converter 324, a DC/AC converter 325, a controller 326, an external communication port 327, a pull-down circuit 328, and second connectors 3291 and 3292, wherein the AC/DC converter 321 is configured to receive the AC power from the power source 21 through the second connector 3291 disposed at the input terminal and convert the AC power into a DC power. The charger circuit 322 is connected with the AC/DC converter 321 for receiving the DC voltage outputted from the AC/DC converter 321 and converting the DC voltage into a DC voltage tailored to charge the battery 323.

The DC/DC converter 324 is configured to receive a DC voltage from the battery 323 when the power source 21 is unavailable for supplying power and boost the DC voltage. The boosted DC voltage is transferred to and converted by the DC/AC converter 325 into an output AC voltage. The output AC voltage is outputted to the load 22 through the second connector 3292 disposed at the output terminal.

The controller 326 is connected with the AC/DC converter 321, the charger circuit 322, the DC/DC converter 324, the DC-AC converter 325, the external communication port 327, the pull-down circuit 328, and the second connector 3292 disposed at the output terminal. The controller 326 is configured to manipulate the operation of the AC/DC converter 321, the charger circuit 322, the DC/DC converter 324 and the DC-AC converter 325 and monitors the output voltage of the first uninterruptible power supply 32.

The input terminal and the output terminal of the first uninterruptible power supply 32 are respectively connected to the input terminal and the output terminal of the distribution box 31 through the transmission lines 341 and 342. Both ends of the transmission lines 341 and 342 are equipped with a third connector (not shown). The transmission line 341 is connected with the first connector 312 disposed at the output terminal of the distribution box 31 and the second connector 3291 disposed at the input terminal of the first uninterruptible power supply 32. The transmission line 342 is connected with the second connector 313 disposed at the input terminal of the distribution box 31 and the second connector 3292 disposed at the output terminal of the first uninterruptible power supply 32.

Figure 4:
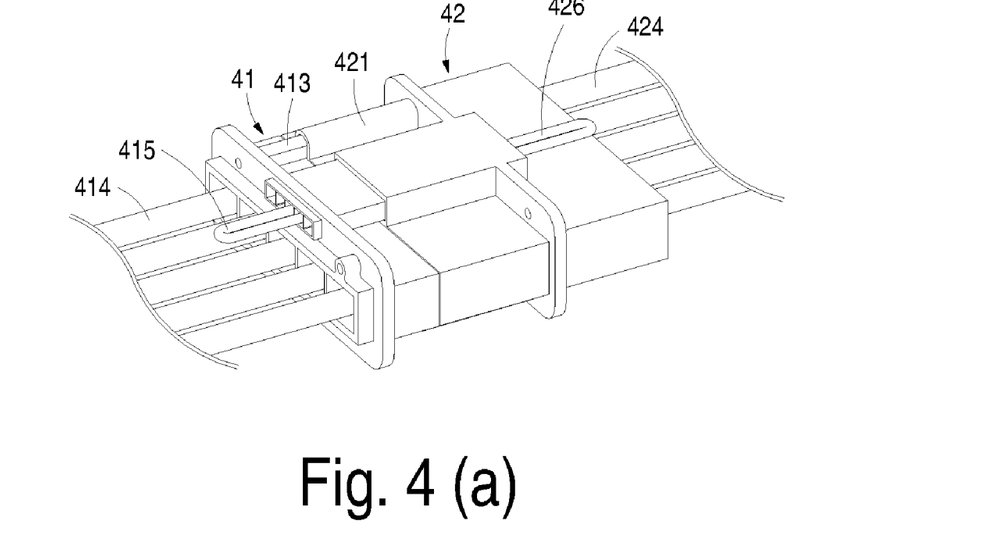
FIG. 4(a) is a plan view showing the detached structure of the connector shown in FIG. 3.
FIG. 4(b) is a plan view showing the assembled structure of the connector shown in FIG. 3.
FIG. 4(c) is a plan view showing the partial detached structure of the connector shown in FIG. 3.

Referring to FIG. 4(a), the structure of the connectors of FIG. 3 is shown. As shown in FIG. 4(a), the connection configuration of the third connector disposed at one end of the transmission lines 341 and 342 and the first connectors 312 and 313 and the connection configuration of the third connector disposed at the other end of the transmission lines 341 and 342 and the second connectors 3291 and 3292 are represented by the mating of a male connector 41 and a female connector 42. It is noteworthy that the configuration of these connectors can be arranged depending on the practical applications. For example, the third connector disposed at one end of the transmission lines 341 and 342 can be implemented by as a male connector 41 and the first connectors 312 and 313 can be implemented by as female connectors 42; the third connector disposed at the other end of the transmission lines 341 and 342 can be implemented by a female connector 42 and the second connectors 3291 and 3292 can be implemented by male connectors 41. Also, no matter whether the connectors are implemented by male connectors 41 or female connectors 42, their contact portions are required to shrink inwards to prevent the user from being damaged due to the contact with the power-conducting terminals when the user unplugs the transmission lines 341 and 342.

In the present embodiment, the transmission lines 341 and 342 can be implemented by power cords, and the male connector 41 and the female connector 42 shown in FIG. 4(a) respectively includes a plurality of first conducting structures and a plurality of second conducting structures. The first conducting structure of the male connector 41 can be a first metal holding portion 411 having one end for holding a power cord 414. The second conducting structure of the male connector 41 is a second metal holding portion 412 having a shorter length compared with the first metal holding portion 411. One end of the second metal holding portions 412 is used for holding a signal line 415 so that a plurality of second metal holding portions 412 are connected with each other, as shown in FIG. 4(c).

The first conducting structures of the female connector 42 can be a first conducting piece 423 having one end for holding a power cord 424. The second conducting structures of the female connector 42 can be a second conducting piece 425 having one end for holding a signal line 426 so that the second conducting pieces 425 can be connected with each other, as shown in FIG. 4(a) and FIG. 4(c).

When the male connector 41 and the female connector 42 are connected together, the first conducting piece 423 and the first metal holding portion 411 will be connected together, and the second conducting piece 425 and the second metal holding portion 412 will be connected together, as shown in FIG. 4(b). Adversely, when the male connector 41 and the female connector 42 are detached, the second conducting piece 425 and the second metal holding portion 412 will be detached prior to the detachment between the first conducting piece 423 and the first metal holding portion 411. Referring to FIG. 4(c), when the male connector 41 is separated from the female connector 42 by a specific distance, the second conducting piece 425 and the second metal holding portion 412 have been completely detached.

In order to prevent the user from being damaged due to the contact with the contact portions when the user unplugs the transmission lines 341 and 342, the first metal holding portion 411 and the second metal holding portion 412 of the male connector 41 and the first conducting piece 423 and the second conducting piece 425 of the female connector 42 are placed inside the housing. Furthermore, in order to allow the male connector 41 and the female connector 42 to be securely mated with each other, a plurality of ribs 413 are provided on the male connector 41 and a plurality of tracks 421 and grooves 422 are provided on the female connector 42. When the male connector and the female connector are mated, the ribs 413 are fitted with corresponding tracks 421 and grooves 422, so that the male connector 41 and the female connector 42 are securely mated with each other, as shown in FIG. 4(b).

Referring to FIG. 3 again, one of the signal receiving ends of the second connector 3291 of the first uninterruptible power supply 32 is connected with a resistor R1, and the other signal receiving end is connected with the pull-down circuit 328. When the third connectors disposed at both ends of the transmission line 341 are respectively connected with the first connector 312 of the distribution box 31 and the second connector 3291 of the first uninterruptible power supply 32, the first connector 312 of the distribution box 31, the transmission line 341, the resistor R1 connected to the second connector 3291, and the pull-down circuit 328 form a circuit loop, and a voltage source applies a 5V voltage to the resistor R1.

The circuit structure and connection configuration of the first connector 313 disposed at the input terminal of the distribution box 31, the transmission line 342, and the second connector 3292 disposed at the output terminal of the first uninterruptible power supply 32 are the same with those of the first connector 312, the transmission line 341, and the second connector 3291 disposed at the input terminal of the first uninterruptible power supply 32, and it is not intended to give details herein.

When both ends of transmission lines 341 and 342 are connected with the distribution box 31 and the first uninterruptible power supply 32, the 5V voltage will be transmitted from the resistor R1 to the pull-down circuit 328 through the circuit loop consisting of the first connector 312 of the distribution box 31, the transmission line 341, the resistor R1 connected to the second connector 3291 and the pull-down circuit 328. The pull-down circuit 328 will transmit the 5V voltage to the controller 326, so that the controller 326 can ensure the normal operation of the first uninterruptible power supply 32 according to this voltage signal and maintain the normal operation of the first uninterruptible power supply 32.

On the contrary, if the user unplugs one end of the transmission line 341 or 342, the detachment between second conducting piece 425 and the second metal holding portion 412 will take place prior to the detachment between the first conducting piece 423 and the first metal holding portion 411. Thus, the second metal holding portion 412 of the male connector 41 will be detached from the female connector 42 prior to the first metal holding portion 411, as shown in FIG. 4(c). As long as the second metal holding portion 412 of the male connector 41 is detached from the second conducting piece 425 of the female connector 42, the first connector 312 or 313 of the distribution box 31, the transmission line 341 or 342, the resistor R1 connected with the second connector 3291 or 3292, and the pull-down circuit 328 can not form a circuit loop, so that a 0V voltage is transmitted from the pull-down circuit 328 to the controller 326. In the meantime, the controller 326 will determine that the first uninterruptible power supply 32 is abnormal according to this voltage signal and generate a control signal to stop the operation of the AC/DC converter 321 and the DC/AC converter 325, so that the first uninterruptible power supply 32 will stop operating and the output terminal of the distribution box 31 will not transmit a current to the first uninterruptible power supply 32. Therefore, when the first metal holding portion 411 of the male connector 41 is detached from the first conducting piece 423 of the female connector 42, there will not induce arc discharge phenomenon, and the malfunctioned first uninterruptible power supply 32 can be removed safely.

It can be understood from the above statements that the first uninterruptible power supply 32 and the second uninterruptible power supply 33 are disposed in parallel. When one of the uninterruptible power supplies is malfunctioned, the load can be powered by the other uninterruptible power supply. As long as the transmission line that is connected between the malfunctioned uninterruptible power supply and the distribution box 31 is unplugged, the malfunctioned uninterruptible power supply can be removed from the system for repair.

The switch 311 within the distribution box 31 is configured to switch when the first uninterruptible power supply 32 and/or the second uninterruptible power supply 33 are operating normally, so that the first uninterruptible power supply 32 and/or the second uninterruptible power supply 33 can be connected to the load 22 through the connector 313. Thus, the load 22 will be continuously powered even if the power source 21 is unavailable for supplying power so as to ensure the normal operation of the load 22. Adversely, if the first uninterruptible power supply 32 and the second uninterruptible power supply 33 are both malfunctioned, the switch 311 is switched to the bypass route to enable the power source 21 to be connected with the load 22, thereby powering the load 22 by the AC power outputted from the power source 21. The pull-down circuit 328 can be made up of a resistor R2 and a capacitor. However, the circuitry of the pull-down circuit 328 is not limited to the précised form disclosed herein.

Besides, the first uninterruptible power supply 32 and the second uninterruptible power supply 33 respectively includes an external communication port 327 and 337 that is configured to enable the first uninterruptible power supply 32 and the second uninterruptible power supply 33 to transmit the circuit operating status and related data signals to the opposite side uninterruptible power supply. Therefore, the first uninterruptible power supply 32 and the second uninterruptible power supply 33 can communicate with each other to equally share the energy demand required by the load. When one of the uninterruptible power supplies is malfunctioned, the other uninterruptible power supply can adjust its energy output amount through the communication signals transmitted through the external communication ports 327 and 337.

Figure 5:
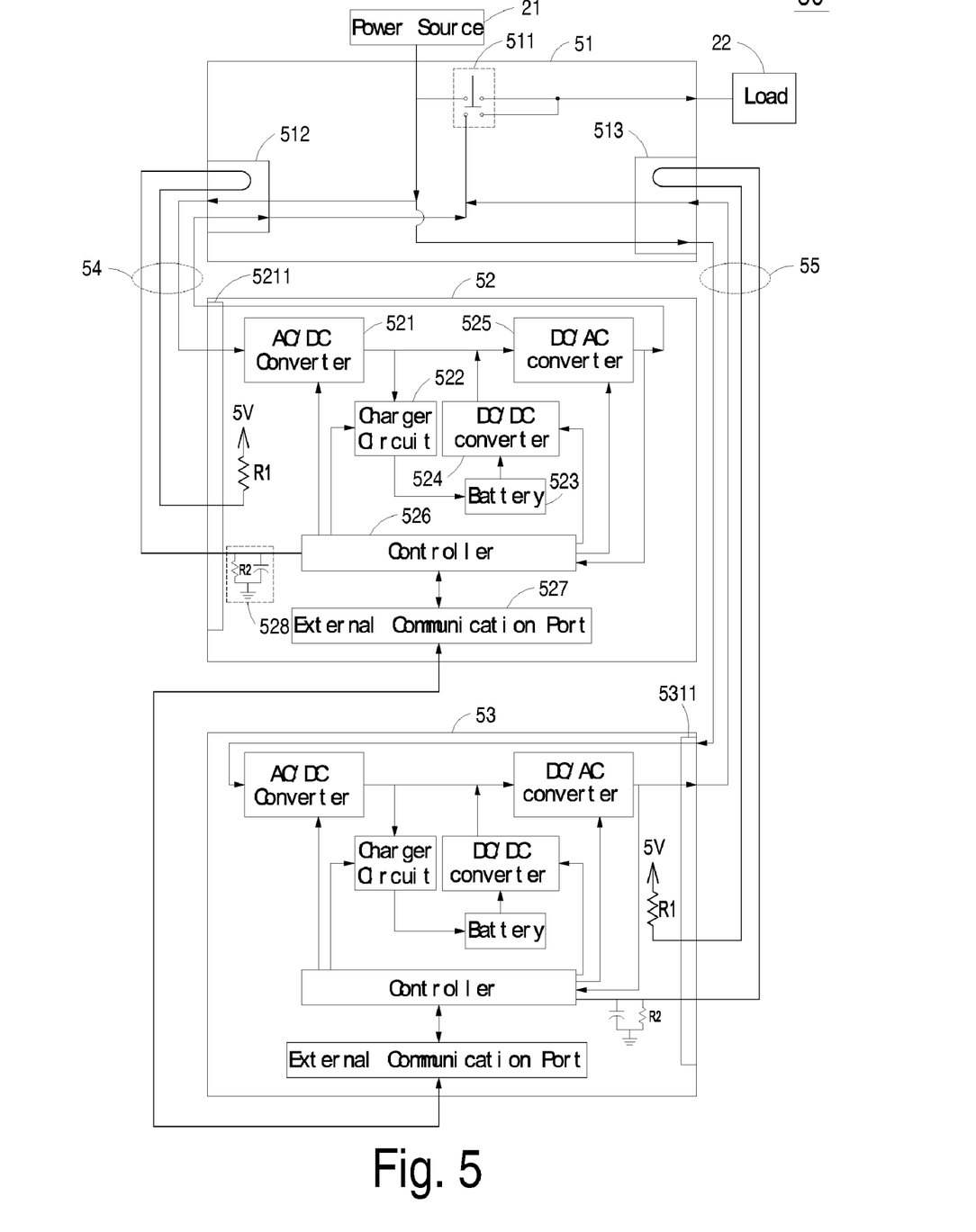
FIG. 5 is a circuit diagram showing the structure of the parallel-connected uninterruptible power supply system according to a second preferred embodiment of the present invention.

Referring to FIG. 5, the structure of the parallel-connected uninterruptible power supply system according to a second embodiment of the present invention is shown. The parallel-connected uninterruptible power supply system is connected with a power source 21 and a load 22, and includes a distribution box 51, a first uninterruptible power supply 52, a second uninterruptible power supply 53, and transmission lines 54 and 55. It is to be noted that both of the first uninterruptible power supply 52 and the second uninterruptible power supply 53 have similar circuit structure.

The circuit elements of the first uninterruptible power supply 52, such as the AC/DC converter 521, charger circuit 522, battery 523, DC/DC converter 524, DC/AC converter 525, controller 526, external communication port 527, and the pull-down circuit 528 have been described in detail in the foregoing discussion associated with the first preferred embodiment, and thus it is note intended to give details herein.

In the present embodiment, the distribution box 51 includes a switch 511 and first connectors 512 and 513 respectively disposed at the input terminal and the output terminal. Also, both ends of the transmission lines 54 and 55 include a third connector. The first uninterruptible power supply 52 and the second uninterruptible power supply 53 respectively includes a second connector 5211 and 5311. Because the first uninterruptible power supply 52 and the second uninterruptible power supply 53 both have the same circuit structure and connection configuration with the distribution box 51 and the transmission lines 54 and 55, the first uninterruptible power supply 52 is intended to be taken as an example for the purpose of illustration.

Certainly, the first connectors 512 and 513, the second connectors 5211 and 5311, and the third connectors all have the same structure with the connectors shown in FIG. 4(a), FIG. 4(b) and FIG. 4(c). The difference between the present embodiment and the first preferred embodiment is that the manufacturer can dispose the voltage input terminal and voltage output terminal of the uninterruptible power supplies 52 and 53 on the same connector. Therefore, the first connectors 512 and 513 of the distribution box 51, the third connectors of the transmission lines 54 and 55, and the second connectors 5211 and 5311 of the first uninterruptible power supply 52 and the second uninterruptible power supply 53 all have to include voltage input terminals and voltage output terminals for transmitting power. Hence, the first uninterruptible power supply 52 only needs a transmission line 54 to be connected with the distribution box 51, and the second uninterruptible power supply 53 only needs a transmission line 55 to be connected with the distribution box 51.

When both ends of the transmission line 54 are connected with the distribution box 51 and the second connector 5211 of the first uninterruptible power supply 52, the 5V voltage will be transmitted from the resistor R1 to the pull-down circuit 528 through the circuit loop consisting of the first connector 511 of the distribution box 51, the transmission line 54, the resistor R1 connected to the second connector 5211 and the pull-down circuit 528. The pull-down circuit 528 will transmit the 5V voltage to the controller 526, so that the controller 526 can ensure the normal operation of the first uninterruptible power supply 52 according to this voltage signal and maintain the normal operation of the first uninterruptible power supply 52.

On the contrary, if the user unplugs one end of the transmission line 54, the detachment between second conducting piece 425 and the second metal holding portion 412 will take place prior to the detachment between the first conducting piece 423 and the first metal holding portion 411. Thus, the second metal holding portion 412 of the male connector 41 will be detached from the female connector 42 prior to the first metal holding portion 411, as shown in FIG. 4(c). As long as the second metal holding portion 412 of the male connector 41 is detached from the second conducting piece 425 of the female connector 42, the first connector 512 of the distribution box 51, the transmission line 54, the resistor R1 connected with the second connector 5211, and the pull-down circuit 528 can not form a circuit loop, so that a 0V voltage is transmitted from the pull-down circuit 528 to the controller 526. In the meantime, the controller 526 will determine that the first uninterruptible power supply 52 is abnormal according to this voltage signal and generate a control signal to stop the operation of the AC/DC converter 521 and the DC/AC converter 525, so that the first uninterruptible power supply 52 will stop operating and the output terminal of the distribution box 51 will not transmit a current to the first uninterruptible power supply 52. Therefore, when the first metal holding portion 411 of the male connector 41 is detached from the first conducting piece 423 of the female connector 42, there will not induce arc discharge phenomenon, and the malfunctioned first uninterruptible power supply 52 can be removed safely.

It can be understood from the above statements that the first uninterruptible power supply 52 and the second uninterruptible power supply 53 are disposed in parallel. When one of the uninterruptible power supplies is malfunctioned, the load can be powered by the other uninterruptible power supply. As long as the transmission line that is connected between the malfunctioned uninterruptible power supply and the distribution box 51 is unplugged, the malfunctioned uninterruptible power supply can be removed from the system for repair.

Figure 6:
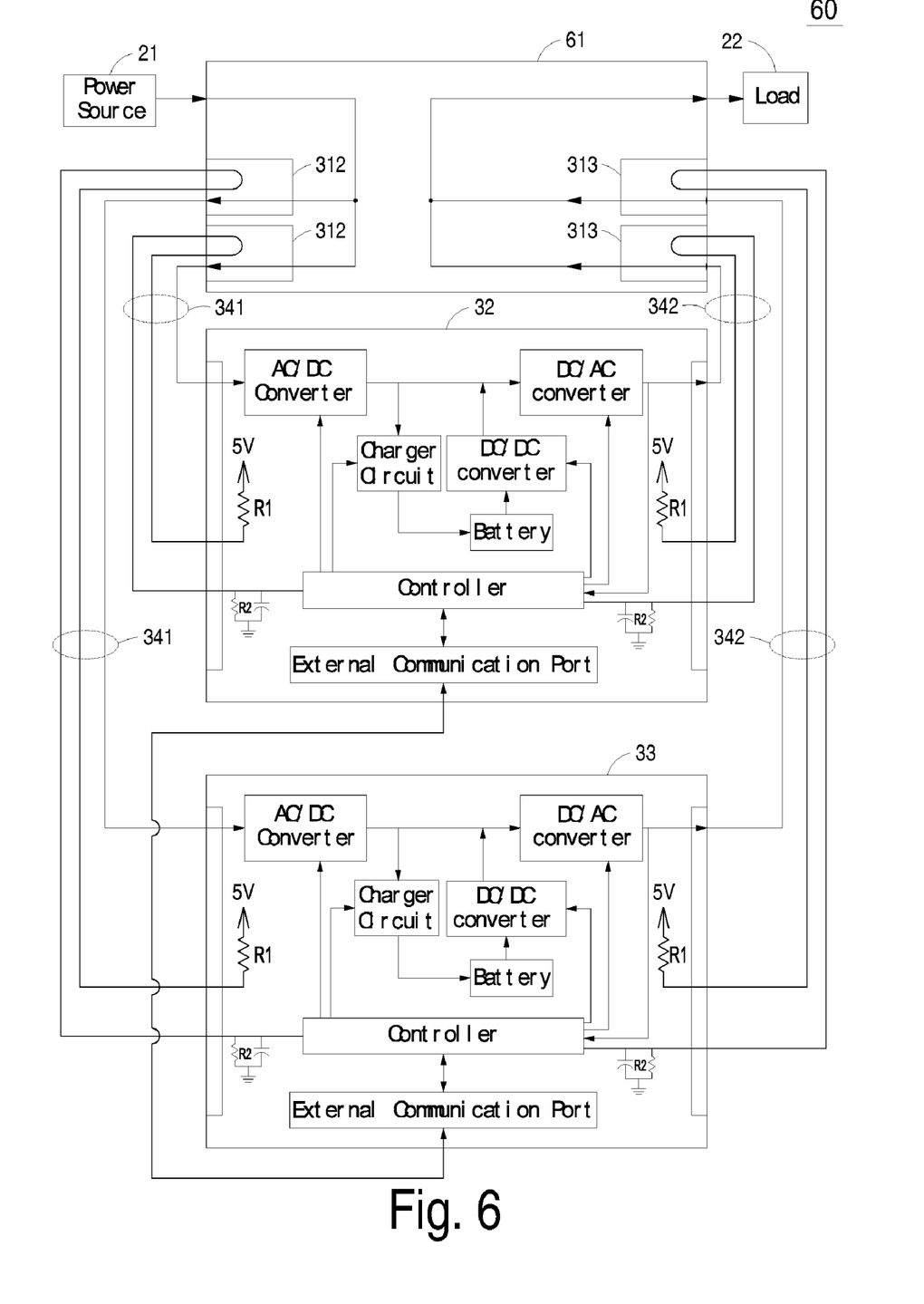
FIG. 6 is a circuit diagram showing the structure of the parallel-connected uninterruptible power supply system according to a third preferred embodiment of the present invention.

Referring to FIG. 6, the structure of the parallel-connected uninterruptible power supply system according to a third embodiment of the present invention is shown. As shown in FIG. 6, the parallel-connected uninterruptible power supply system 60 is connected with a power source 21 and a load 22, and includes a distribution box 61, a first uninterruptible power supply 32, a second uninterruptible power supply 33, and transmission lines 341 and 342. The distribution box 61 includes first connectors 312 and 313. It is to be noted that the circuit structure and operating principle of the first connectors 312 and 313 of the distribution box 61, the first uninterruptible power supply 32, the second uninterruptible power supply 33, and transmission lines 341 and 342 have been described in detail in the foregoing description associated with the first preferred embodiment, and it is not intended to give details herein.

In the present embodiment, the distribution box 61 does not have a bypass route. When the first uninterruptible power supply 32 and/or the second uninterruptible power supply 33 are operating normally, the voltage required to power the load 22 will be provided by the first uninterruptible power supply 32 and/or the second uninterruptible power supply 33. Adversely, if the first uninterruptible power supply 32 and the second uninterruptible power supply 33 are both malfunctioned, the load 22 will not be powered and will not operate normally.

Figure 7:
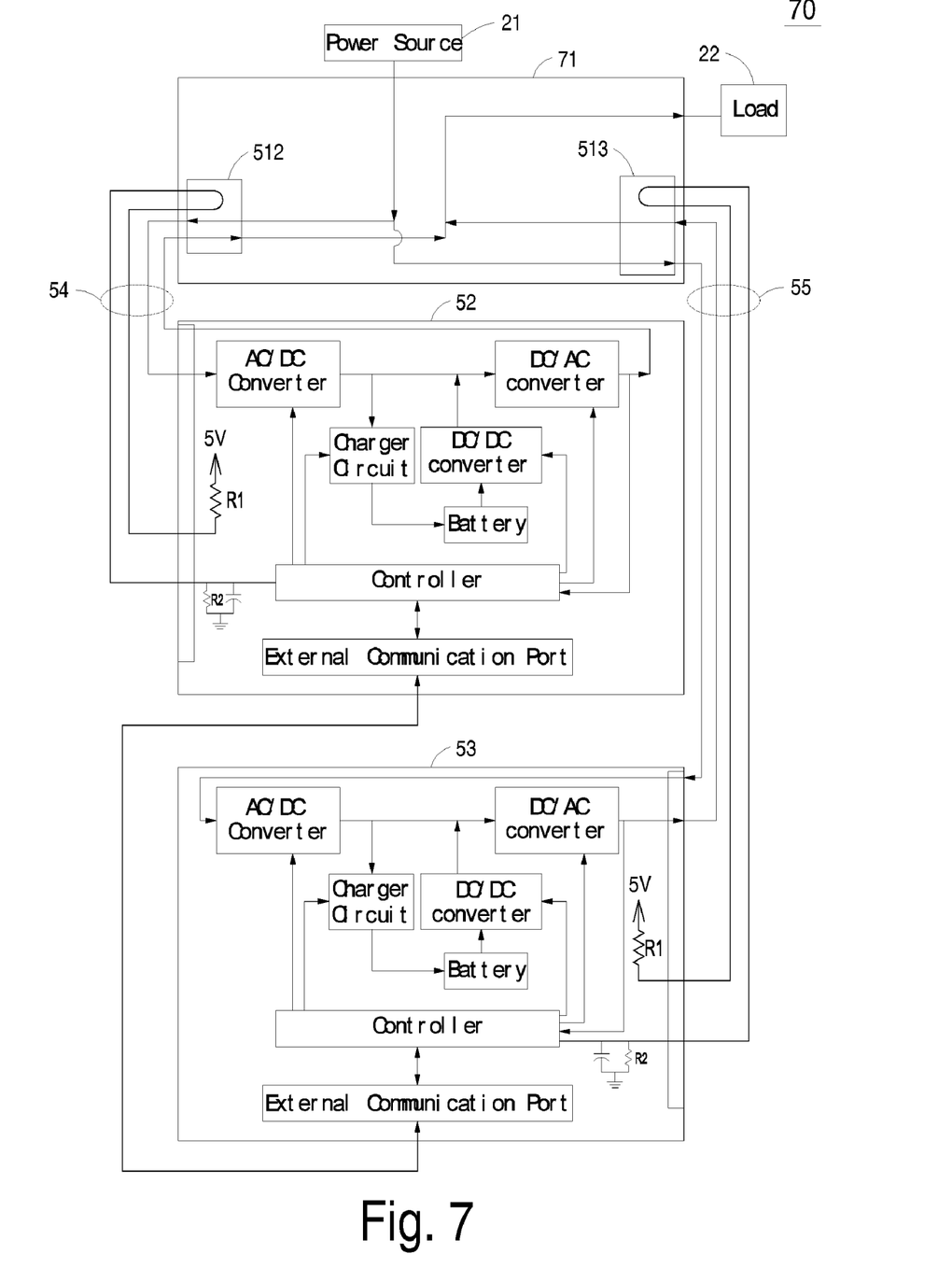
FIG. 7 is a circuit diagram showing the structure of the parallel-connected uninterruptible power supply system according to a fourth preferred embodiment of the present invention.

Referring to FIG. 7, the structure of the parallel-connected uninterruptible power supply system according to a fourth embodiment of the present invention is shown. As shown in FIG. 7, the parallel-connected uninterruptible power supply system 70 is connected with a power source 21 and a load 22, and includes a distribution box 71, a first uninterruptible power supply 52, a second uninterruptible power supply 53, and transmission lines 54 and 55. The distribution box 71 includes first connectors 512 and 513. It is to be noted that the circuit structure and operating principle of the first connectors 512 and 513 of the distribution box 71, the first uninterruptible power supply 52, the second uninterruptible power supply 53, and transmission lines 54 and 55 have been described in detail in the foregoing description associated with the second preferred embodiment, and it is not intended to give details herein.

In the present embodiment, the distribution box 71 does not have a bypass route. When the first uninterruptible power supply 52 and/or the second uninterruptible power supply 53 are operating normally, the voltage required to power the load 22 will be provided by the first uninterruptible power supply 52 and/or the second uninterruptible power supply 53. Adversely, if the first uninterruptible power supply 52 and the second uninterruptible power supply 53 are both malfunctioned, the load 22 will not be powered and will not operate normally.

In conclusion, the inventive parallel-connected uninterruptible power supply system includes a power distribution circuit, a plurality of uninterruptible power supplies, and a plurality of transmission lines. The power distribution circuit includes a first connector, and the uninterruptible power supply includes a second connector. Also, the transmission line includes a third connector at both ends. The first connector, the second connector, and the third connector all have a plurality of first conducting structures and a plurality of second conducting structures having a shorter length compared to the first conducting structure. When the connector of the transmission line is detached from the connector of the uninterruptible power supply or from the connector of the power distribution circuit, the pull-down circuit of the uninterruptible power supply to which the transmission line is connected will send a control signal to the controller to stop the operation of the uninterruptible power supply, so that the transmission line can be unplugged from the power distribution circuit or the uninterruptible power supply and the malfunctioned uninterruptible power supply can be removed for repair. Also, the load can be powered by the functioning uninterruptible power supply.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A parallel-connected uninterruptible power supply system connected to a power source and a load, comprising:
a power distribution circuit connected to the power source and the load and having a plurality of first connectors;
a plurality of uninterruptible power supplies, each of which includes a controller, at least one second connector and a pull-down circuit, wherein the pull-down circuit is connected to the controller and the second connector; and
a plurality of transmission lines, wherein each of which includes two ends and a pair of third connectors each disposed at one end, and wherein the third connector is connected with the first connector of the power distribution circuit and a second connector of an uninterruptible power supply;

wherein the first connector, the second connector and the third connector respectively includes a plurality of first conducting structures and a plurality of second conducting structures, and when the second conducting structure of the third connector is detached from the second conducting structure of the first connector or from the second conducting structure of the second connector, a pull-down circuit of the corresponding uninterruptible power supply to which the third connector is connected sends a control signal to the controller to stop the operation of the corresponding uninterruptible power supply, such that the first conducting structure of the third connector is safely detached from the first connector or from the second connector and a malfunctioned uninterruptible power supply is removed from the parallel-connected uninterruptible power supply system for repair.

2. The parallel-connected uninterruptible power supply system according to claim 1 wherein the power source is configured to provide an AC power.

3. The parallel-connected uninterruptible power supply system according to claim 2 wherein the power distribution circuit is a distribution box for distributing the AC power of the power source to the plurality of uninterruptible power supplies, and delivering the AC power of the plurality of uninterruptible power supplies to the load.

4. The parallel-connected uninterruptible power supply system according to claim 2 wherein the power distribution circuit further includes a switch connected to the power source, the plurality of uninterruptible power supplies and the load for allowing the power source to be connected to the load to enable the AC power of the power source to be supplied to the load when all of the uninterruptible power supplies are malfunctioned.

5. The parallel-connected uninterruptible power supply system according to claim 2 wherein each of the plurality of uninterruptible power supplies include an AC/DC converter, a charger circuit and a battery, wherein the AC/DC converter is configured to receive the AC power from the power source and convert the AC power into a DC power, and the charger circuit is connected to the AC/DC converter for converting the DC power into a DC voltage tailored to charge the battery.

6. The parallel-connected uninterruptible power supply system according to claim 5 wherein each of the plurality of uninterruptible power supplies further includes a DC/DC converter and a DC/AC converter, wherein the DC/DC converter is connected to the battery for boosting the DC voltage outputted from the battery when the power source is unavailable for supplying power and delivering the boosted DC voltage to the DC/AC converter to convert the boosted DC voltage into an AC voltage for use by the load.

7. The parallel-connected uninterruptible power supply system according to claim 6 wherein each of the plurality of uninterruptible power supplies further includes an external communication port connected to the controller for communicating with other uninterruptible power supplies through a signal transmission line.

8. The parallel-connected uninterruptible power supply system according to claim 1 wherein the connection configuration of the third connector disposed at one end of the transmission line and the first connector and the connection configuration of the third connector disposed at the other end of the transmission line and the second connector are represented by the mating of a male connector and a female connector.

9. The parallel-connected uninterruptible power supply system according to claim 8 wherein the male connector and the female connector both having power-conducting terminals being shrunk inwards to prevent a user from being contacting the power-conducting terminals when the plurality of transmission lines are unplugged.

10. The parallel-connected uninterruptible power supply system according to claim 9 wherein the plurality of first conducting structures of the male connector are first metal holding portions having one end for holding a power cord, and the plurality of second conducting structures are second metal holding portions having a length being shorter than the first metal holding portions, wherein the plurality of second conducting structures are configured to hold a signal line and connected with each other.

11. The parallel-connected uninterruptible power supply system according to claim 10 wherein the plurality of first conducting structures of the female connector are first conducting pieces having one end for holding a power cord, and the plurality of second conducting structures are second conducting pieces for holding a signal line and being connected with each other.

12. The parallel-connected uninterruptible power supply system according to claim 11 wherein when the male connector is connected with the female connector, the first conducting piece is connected with the first metal holding portion and the second conducting piece is connected with the second metal holding portion, and when the male connector is detached from the female connector, the second conducting piece is detached from the second metal holding portion before the first conducting piece is detached from the first metal holding portion.

13. The parallel-connected uninterruptible power supply system according to claim 12 wherein when the third connectors of the transmission line are respectively connected with the second connector and the first connector, the transmission line, the second connector, a resistor and the pull-down circuit form a circuit loop.

14. The parallel-connected uninterruptible power supply system according to claim 13 wherein when the third connector is detached from the first connector or from the second connector, the second conducting piece is detached from the second metal holding portion before the first conducting piece is detached from the first metal holding portion, such that the pull-down circuit of the corresponding uninterruptible power supply sends a control signal to the controller to stop the operation of the corresponding uninterruptible power supply, thereby allowing the third connector to be safely detached from the first connector or from the second connector and allowing a malfunctioned uninterruptible power supply to be removed from the parallel-connected uninterruptible power supply system for repair.

* * * * *